(12) United States Patent
Osumi et al.

(10) Patent No.: US 11,520,080 B2
(45) Date of Patent: Dec. 6, 2022

(54) PROCESSING APPARATUS AND PROCESSING METHOD

(71) Applicant: TOYOTA JIDOSHA KABUSHIKI KAISHA, Toyota (JP)

(72) Inventors: Ryota Osumi, Nagoya (JP); Noriaki Saito, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 16/509,543

(22) Filed: Jul. 12, 2019

(65) Prior Publication Data

US 2020/0103554 A1 Apr. 2, 2020

(30) Foreign Application Priority Data

Sep. 28, 2018 (JP) ............................. JP2018-184599

(51) Int. Cl.
*G01W 1/14* (2006.01)
*H04W 4/44* (2018.01)
*G01W 1/00* (2006.01)

(52) U.S. Cl.
CPC ................ *G01W 1/14* (2013.01); *H04W 4/44* (2018.02); *G01W 2001/006* (2013.01)

(58) Field of Classification Search
CPC . B60S 1/0818; G01W 1/14; G01W 2001/006; H04W 4/08; H04W 4/44
See application file for complete search history.

(56) References Cited

U.S. PATENT DOCUMENTS

| 2005/0246089 | A1* | 11/2005 | Muehlbauer | B60K 31/04 701/93 |
| 2008/0030370 | A1* | 2/2008 | Doyle | G01W 1/00 340/995.13 |
| 2015/0203107 | A1* | 7/2015 | Lippman | B60W 30/16 701/23 |
| 2016/0005314 | A1* | 1/2016 | Fulger | G01C 21/3492 340/905 |
| 2016/0297406 | A1* | 10/2016 | Jansen | B60S 1/0818 |
| 2019/0152477 | A1* | 5/2019 | Salter | B60W 30/16 |
| 2019/0377339 | A1* | 12/2019 | Nath | B60W 40/112 |

FOREIGN PATENT DOCUMENTS

| JP | 09-240433 A | 9/1997 |
| JP | 2012-215969 | 11/2012 |
| JP | 2018-109820 A | 7/2018 |

* cited by examiner

*Primary Examiner* — Kyle R Quigley
(74) *Attorney, Agent, or Firm* — Oblon, McClelland, Maier & Neustadt, L.L.P.

(57) ABSTRACT

A processing apparatus includes a data collection unit and a correlation degree derivation unit. The data collection unit is configured to collect operation mode data indicating an operation mode of a windshield wiper, acquired in one or more vehicles. The correlation degree derivation unit is configured to derive a degree of correlation between the operation mode data and precipitation amount data.

13 Claims, 10 Drawing Sheets

```
                                              8
┌─────────────────────────────────┐
│ TRAFFIC INFORMATION             │
│                                 │
│ · VEHICLE IDENTIFICATION        │
│   NUMBER (VIN)                  │
│ · ROAD LINK ID                  │
│ · DATE AND TIME OF ENTRY        │
│   INTO ROAD LINK                │
│ · CONGESTION DEGREE             │
│ · AVERAGE VEHICLE SPEED         │
│              :                  │
│              :                  │
│              :                  │
│                                 │
└─────────────────────────────────┘
```

FIG. 2B

```
                                              9
┌─────────────────────────────────┐
│ CAN INFORMATION                 │
│                                 │
│ · VEHICLE IDENTIFICATION        │
│   NUMBER (VIN)                  │
│ · DATE AND TIME                 │
│ · LATITUDE AND LONGITUDE        │
│ · VEHICLE SPEED                 │
│ · ACCELERATION                  │
│ · OPERATION DATA                │
│ · RAIN-RELATED DATA             │
│     · WINDSHIELD WIPER          │
│       OPERATION MODE DATA       │
│     · RAINFALL AMOUNT DATA      │
│ · STATE OF SEATBELT             │
│                                 │
│              :                  │
│              :                  │
│              :                  │
└─────────────────────────────────┘
```

| AREA ID (MESH CODE) | VEHICLE | ... | 15:00:00 | 15:00:20 | 15:00:40 | 15:01:00 | 15:01:20 | 15:01:40 | 15:02:00 | 15:02:20 | 15:02:40 | 15:03:00 | 15:03:20 | 15:03:40 | ... |
|---|---|---|---|---|---|---|---|---|---|---|---|---|---|---|---|
| XXXXXX | A | ... | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | ... |
| XXXXXX | B | ... | HIGH SPEED | HIGH SPEED | HIGH SPEED | HIGH SPEED | HIGH SPEED | HIGH SPEED | HIGH SPEED | HIGH SPEED | HIGH SPEED | LOW SPEED | LOW SPEED | LOW SPEED | ... |
| XXXXXX | C | ... | HIGH SPEED | HIGH SPEED | HIGH SPEED | LOW SPEED | LOW SPEED | LOW SPEED | LOW SPEED | LOW SPEED | LOW SPEED | INTER-MITTENT | INTER-MITTENT | INTER-MITTENT | ... |
| XXXXXX | D | ... | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | HIGH SPEED | ... |
| XXXXXX | E | ... |  |  |  |  |  |  |  |  |  | HIGH SPEED | HIGH SPEED | HIGH SPEED | ... |

FIG. 6

| AREA ID (MESH CODE) | VEHICLE | STOP MODE | INTERMITTENT MODE | LOW-SPEED MODE | HIGH-SPEED MODE |
|---|---|---|---|---|---|
| XXXXXX | A | 0 | 0 | 0 | 12 |
| XXXXXX | B | 0 | 0 | 3 | 9 |
| XXXXXX | C | 0 | 3 | 6 | 3 |
| XXXXXX | D | 0 | 0 | 0 | 12 |
| XXXXXX | E | 0 | 0 | 0 | 3 |
| COUNT | | 0 | 3 | 9 | 39 |
| PROPORTION | | 0.000 | 0.059 | 0.176 | 0.765 |

FIG. 7

|  | STOP MODE | INTERMITTENT MODE | LOW-SPEED MODE | HIGH-SPEED MODE |
|---|---|---|---|---|
| ESTIMATED LEVEL OF PRECIPITATION | NO RAIN | LOW | SLIGHTLY HEAVY | HEAVY |

| | STOP MODE | INTERMITTENT MODE | LOW-SPEED MODE | HIGH-SPEED MODE |
|---|---|---|---|---|
| WEIGHT FOR CALCULATE INDEX | 0 | 2 | 6 | 10 |

| VEHICLE | 17:01 | 17:02 | 17:03 | 17:04 | 17:05 |
|---|---|---|---|---|---|
|  | 15mm | 15mm | 15mm | 15mm | 15mm |
| X | HIGH SPEED | HIGH SPEED | HIGH SPEED | HIGH SPEED | HIGH SPEED |
| Y | LOW SPEED | LOW SPEED | LOW SPEED | LOW SPEED | LOW SPEED |
| Z | LOW SPEED | LOW SPEED | HIGH SPEED | HIGH SPEED | HIGH SPEED |

FIG. 10B

| VEHICLE | 17:01 | 17:02 | 17:03 | 17:04 | 17:05 |
|---|---|---|---|---|---|
|  | 15mm | 15mm | 15mm | 15mm | 15mm |
| X | HIGH SPEED | HIGH SPEED | HIGH SPEED | HIGH SPEED | HIGH SPEED |
| Y | LOW SPEED | LOW SPEED | LOW SPEED | LOW SPEED | LOW SPEED |
| Z | LOW SPEED | LOW SPEED | LOW SPEED | LOW SPEED | LOW SPEED |

PROCESSING APPARATUS AND PROCESSING METHOD

INCORPORATION BY REFERENCE

The disclosure of Japanese Patent Application No. 2018-184599 filed on Sep. 28, 2018 including the specification, drawings, and abstract is incorporated herein by reference in its entirety.

BACKGROUND

1. Technical Field

The present disclosure relates to a technology for deriving a relationship between an operation mode of a windshield wiper and a precipitation amount based on information acquired in a vehicle.

2. Description of Related Art

Japanese Unexamined Patent Application Publication No. 2012-215969 discloses a car navigation device that transmits, to a management device, information indicating whether a windshield wiper of a vehicle is being operated or not, together with current time information or current position information. By receiving the information indicating whether the windshield wiper of the vehicle is being operated or not, the management device sets the weather of an observation point at which a photovoltaic power generating device is installed.

SUMMARY

A windshield wiper has a plurality of kinds of operation modes. As a precipitation amount increases, an operation mode in which the windshield wiper operates at high speed is used. The present inventors focused on a relationship between the operation mode of the windshield wiper and the precipitation amount, and found that a precipitation index indicating an intensity of precipitation is derived from the operation mode of the windshield wiper. However, in some cases, the operation mode of the windshield wiper is set depending on a driver's preference, regardless of the precipitation amount. Thus, when the precipitation index is estimated based on collected operation mode data of the windshield wiper as it is, the driver's preference may influence estimation of the precipitation index.

The present disclosure provides a technology for deriving information that indicates a relationship between an operation mode of a windshield wiper and a precipitation amount for each vehicle.

A processing apparatus according to a first aspect of the disclosure includes a data collection unit and a correlation degree derivation unit. The data collection unit is configured to collect operation mode data indicating an operation mode of a windshield wiper, acquired in one or more vehicles. The correlation degree derivation unit is configured to derive a degree of correlation between the operation mode data and precipitation amount data for each of the one or more vehicles.

With the above aspect, it is possible to specify a vehicle having a high degree of correlation between the operation mode data of the windshield wiper and the precipitation amount data.

The processing apparatus may further include an estimation processing unit configured to estimate a precipitation index indicating an intensity of precipitation based on the collected operation mode data. The estimation processing unit may estimate the precipitation index based on the operation mode data collected from a vehicle having a relatively high degree of correlation, which is included in the one or more vehicles.

The vehicle having the relatively high degree of correlation may be a vehicle having a degree of correlation equal to or higher than a predetermined threshold value.

A processing method according to a second aspect of the disclosure includes a step of collecting operation mode data indicating an operation mode of a windshield wiper, acquired in one or more vehicles, and a step of deriving a degree of correlation between the operation mode data and precipitation amount data for each vehicle.

With the above aspect, it is possible to specify a vehicle having a high degree of correlation between the operation mode data of the windshield wiper and the precipitation amount data.

With each aspect of the present disclosure, it is possible to provide a technology for deriving information that indicates a relationship between an operation mode of a windshield wiper and a precipitation amount for each vehicle.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Figure 1:
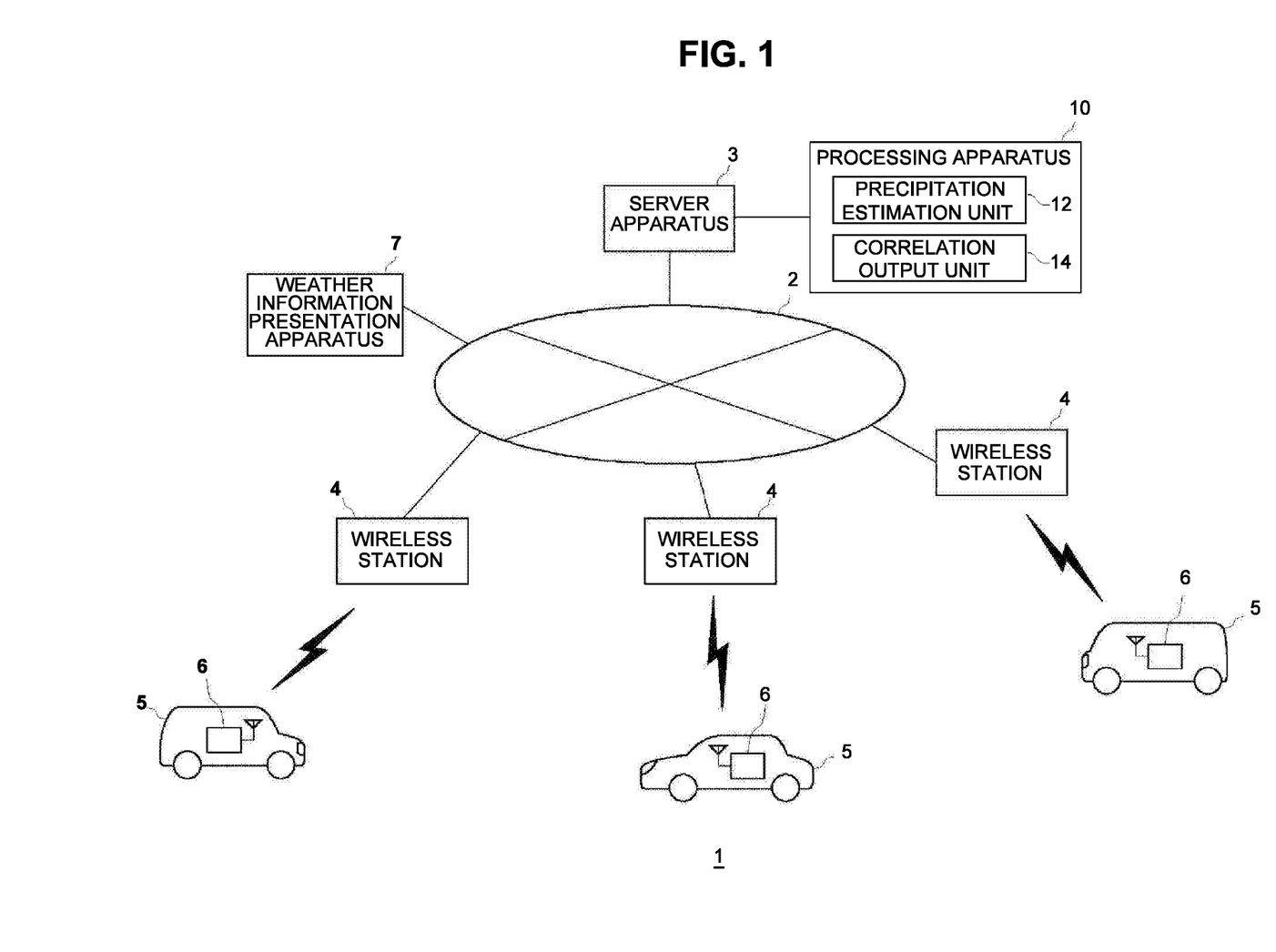
FIG. 1 is a diagram illustrating an overview of an information processing system according to an embodiment.

FIG. 1 illustrates an overview of an information processing system 1 according to an embodiment. The information processing system 1 includes a server apparatus 3, a processing apparatus 10 connected to the server apparatus 3, a weather information presentation apparatus 7 that presents weather information to users, a plurality of wireless stations 4, and a plurality of vehicles 5. The server apparatus 3, the weather information presentation apparatus 7, and the wireless stations 4 may be connected to one another via a network 2, such as the Internet.

A control device 6 mounted on each vehicle 5 has a wireless communication function, and is connected to the server apparatus 3 via the wireless station 4, which is a base station. The number of vehicles 5 is not limited to three. In the information processing system 1 according to the present embodiment, it is assumed that a large number of vehicles 5 generate vehicle state information and transmit the vehicle state information to the server apparatus 3 at a predetermined cycle.

The server apparatus 3 is installed in a data center, and receives the vehicle state information transmitted from the control device 6 of each vehicle 5. The vehicle state information includes traffic information generated by an in-vehicle navigation device, and controller area network (CAN) information transmitted on the CAN in the vehicle 5. The processing apparatus 10 collects operation mode data of a windshield wiper included in the vehicle state information received by the server apparatus 3, and executes a process of estimating a precipitation index indicating an intensity of precipitation for each predetermined period. In the present embodiment, the process of estimating a precipitation index includes a process of estimating an index associated with a precipitation amount, and, for example, an estimated level of the precipitation may be derived. The server apparatus 3 and the processing apparatus 10 may be integrated with each other, and the server apparatus 3 may be equipped with a precipitation index estimation function of the processing apparatus 10.

The processing apparatus 10 includes a precipitation estimation unit 12 that estimates, based on the operation mode data of the windshield wiper of a reliable vehicle, the precipitation index in each of a plurality of areas, for example, every four minutes, and a correlation output unit 14 that specifies the reliable vehicle when collecting the operation mode data of the windshield wiper and estimating the precipitation index. The processing apparatus 10 provides an estimated precipitation index data to the weather information presentation apparatus 7 via the server apparatus 3. The server apparatus 3 and the weather information presentation apparatus 7 may be connected to each other via a dedicated line. Based on the precipitation index data transmitted from the processing apparatus 10, rain cloud conditions acquired from rain cloud radars installed across the country, or the like, the weather information presentation apparatus 7 generates an estimated value of a current precipitation amount in each of the plurality of areas, and presents the estimated value of the current precipitation amount to the users on a web page or the like. By taking into account the precipitation index data that is estimated by the processing apparatus 10 based on the vehicle state information, the weather information presentation apparatus 7 can acquire the estimated value of the current precipitation amount with high accuracy.

Figure 2A:
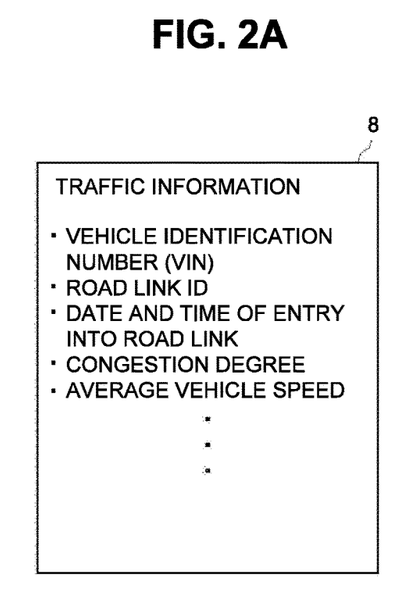
FIG. 2A is a list illustrating an example of vehicle state information.
Figure 2B:
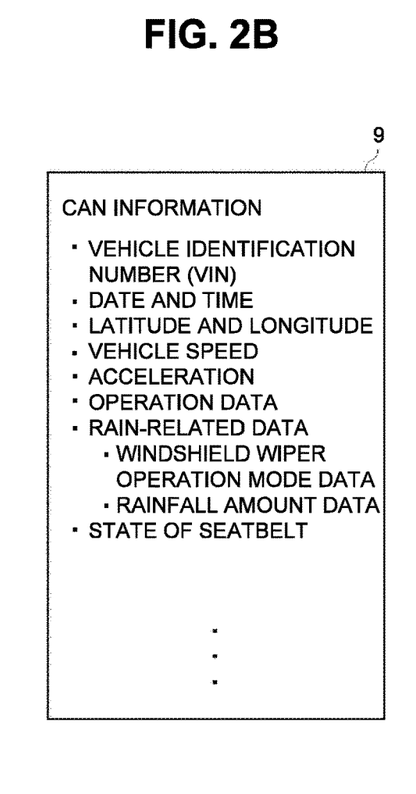
FIG. 2B is a list illustrating another example of the vehicle state information.

FIGS. 2A and 2B illustrate examples of the vehicle state information. The vehicle state information includes the traffic information 8 and the CAN information 9. FIG. 2A illustrates items included in the traffic information 8. The traffic information 8 includes items such as a vehicle identification number (VIN), an ID of a road link on which the vehicle 5 has travelled, a date and time of entry into the road link, a degree of congestion of the road on which the vehicle 5 has travelled, and an average vehicle speed. In the vehicle 5, the in-vehicle navigation device generates the traffic information 8. The control device 6 transmits the traffic information 8 to the server apparatus 3 at a predetermined first cycle. The first cycle may be several minutes. The transmitted traffic information 8 includes information on a road link that the vehicle 5 has passed after transmission of the last traffic information.

FIG. 2B illustrates items included in the CAN information 9. The CAN information 9 includes items such as a VIN, a date and time, a latitude and longitude, vehicle speed, acceleration, operation data, the operation mode data of the windshield wiper, and a state of a seatbelt. The control device 6 acquires data on each item and generates the CAN information 9. The control device 6 transmits the CAN information 9 to the server apparatus 3 at a predetermined second cycle. The second cycle may be from several tens of seconds to one minute. The latitude and longitude included in the CAN information 9 indicates position information of each vehicle 5.

The data sampling cycle may vary depending on the item. For example, data on vehicle speed and data on acceleration may each be acquired at a cycle of several hundred milliseconds, and the operation mode data of the windshield wiper may be acquired at a cycle of several tens of seconds. The data on each of the items, such as the vehicle speed, the acceleration, the operation data, the operation mode data of the windshield wiper, and the state of the seatbelt, is associated with the date and time at which the data is acquired and the latitude and longitude at which the data is acquired.

The operation mode data of the windshield wiper included in the CAN information 9 is used to estimate the precipitation index indicating the intensity of the precipitation, and is used in the process of estimating the precipitation index, which is executed by the processing apparatus 10.

The windshield wiper of each vehicle 5 is a device for wiping rain from the front windshield, or the like, and has a plurality of kinds of operation modes. The windshield wiper according to the present embodiment has the following four kinds of operation modes, and the operation mode data included in the CAN information 9 indicates an operation mode selected from the four kinds of operation modes.

(1) Stop Mode

In stop mode, an operation switch of the windshield wiper is off. In the stop mode, the windshield wiper does not operate.

(2) Intermittent Mode

In intermittent mode, the windshield wiper operates at regular intervals. The intermittent mode is often selected when the rainfall is light, such as when an hourly precipitation amount is more than 0 mm and less than 10 mm.

(3) Low-Speed Mode

In low-speed mode, the windshield wiper operates continuously at low speed. The low-speed mode is often selected when the rainfall is slightly heavy, such as when the hourly precipitation amount is 10 mm or more and less than 20 mm.

(4) High-Speed Mode

In high-speed mode, the windshield wiper operates continuously at high speed. The high-speed mode is often selected when the rainfall is of a high intensity, such as when the hourly precipitation amount is 20 mm or more.

Figure 3:
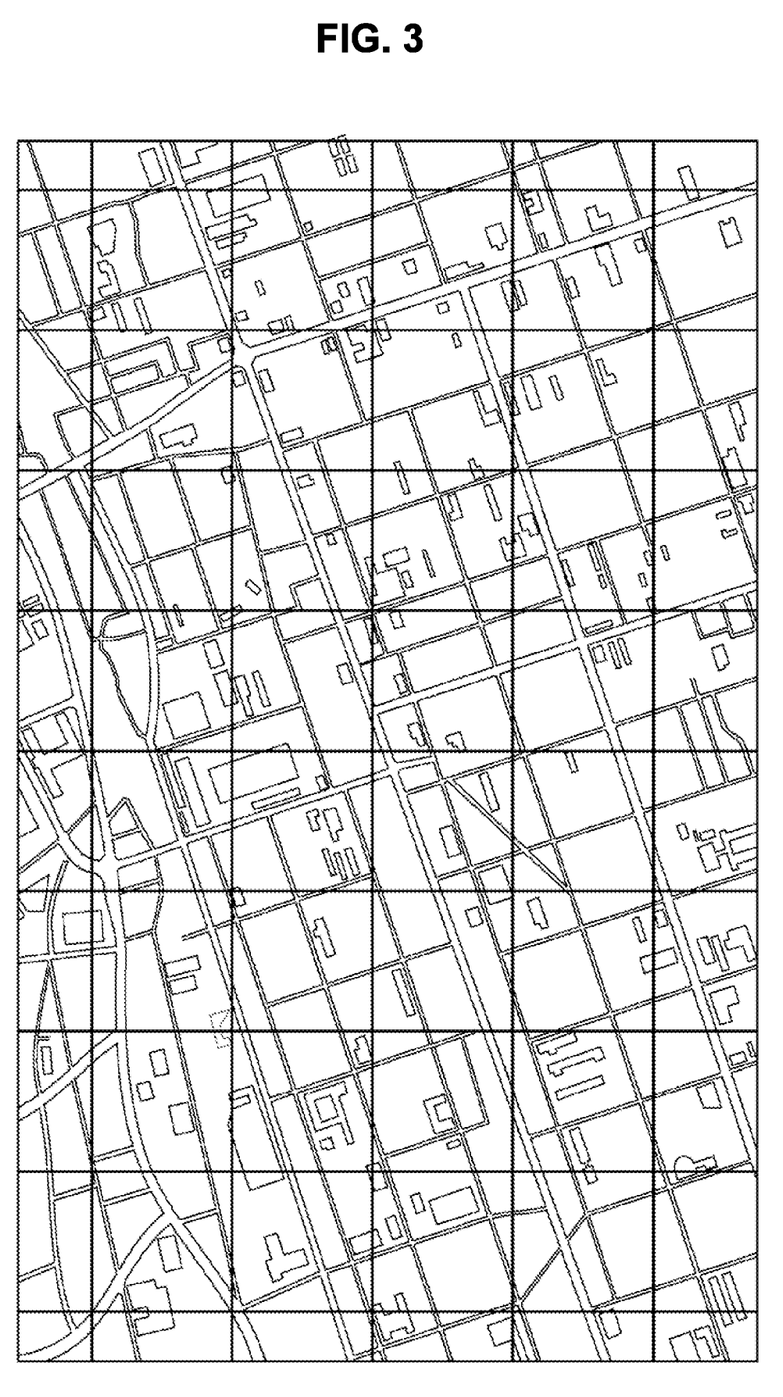
FIG. 3 is a diagram illustrating unit areas for each of which a precipitation index is estimated.

The processing apparatus 10 has a function of acquiring the vehicle state information transmitted from each vehicle 5 and estimating the precipitation index indicating the intensity of precipitation in a predetermined area within a predetermined period. FIG. 3 illustrates unit areas for each of which a precipitation index within a predetermined period is estimated. The processing apparatus 10 estimates a precipitation index within a predetermined period, for each of the unit areas defined by dividing a map with longitudinal lines and lateral lines. The map may be divided into a plurality of areas such that the areas have substantially the same size. Alternatively, the area size may vary depending on, for example, population density.

The map may be divided into a plurality of areas in any given method. In the example illustrated in FIG. 3, the map is divided into meshes of substantially the same size, based on latitude and longitude. For example, in Japan, there is a standard area mesh, set based on latitude and longitude, for use in statistics on each area. The processing apparatus 10 may use this standard area mesh as a unit area for estimation of a precipitation index. In addition, in the standard area mesh, a primary mesh to a tertiary mesh with different sizes are defined, and the length of one side of the tertiary mesh is about 1 km. The processing apparatus 10 may set the tertiary mesh as a unit area for estimation of a precipitation index, but a smaller mesh or a larger mesh may also be set as a unit area for estimation of a precipitation index.

Figure 4:
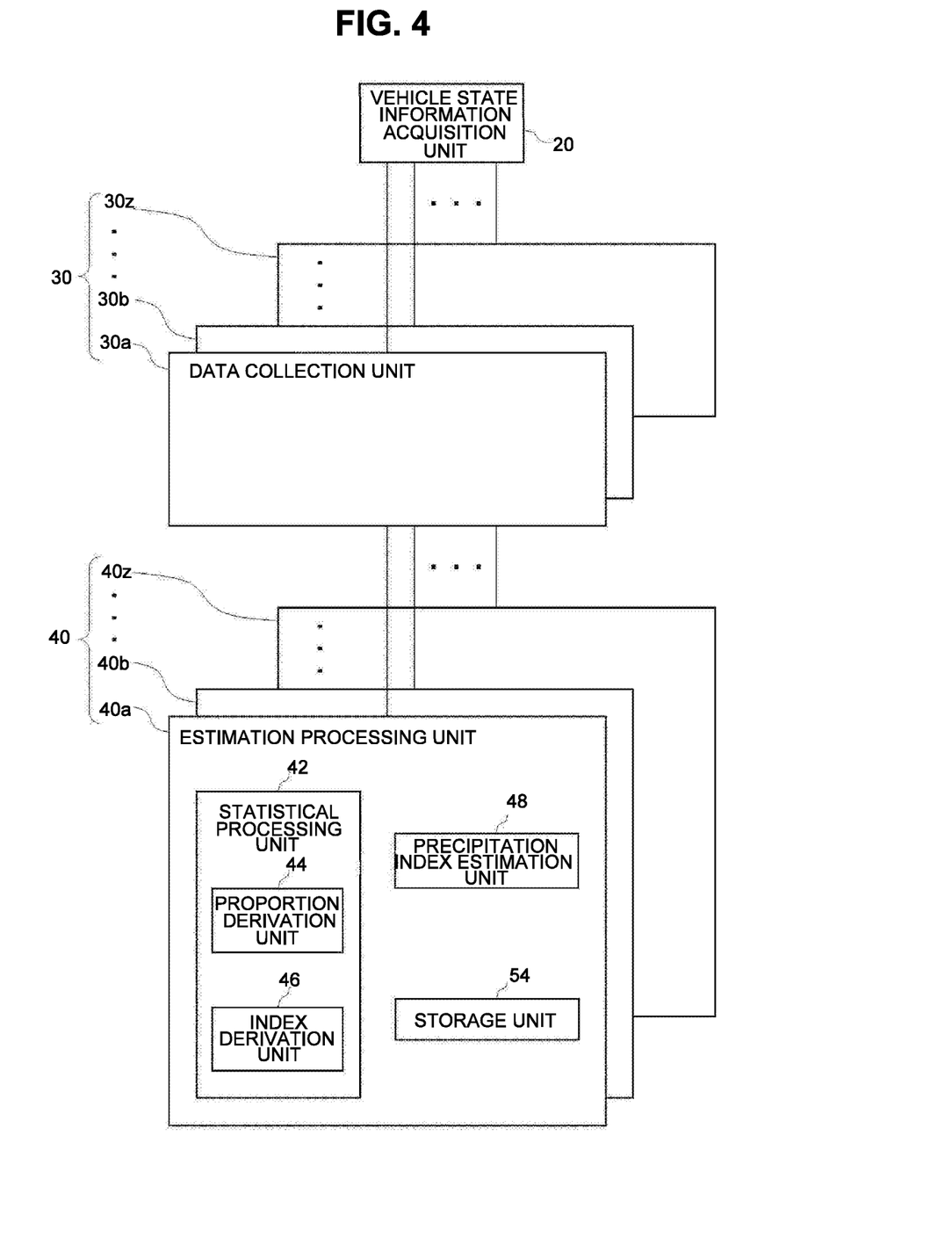
FIG. 4 is a diagram illustrating functional blocks of a precipitation estimation unit of a processing apparatus.

FIG. 4 illustrates functional blocks of the precipitation estimation unit 12 of the processing apparatus 10. The precipitation estimation unit 12 includes a vehicle state information acquisition unit 20, a plurality of data collection units 30a, 30b, ..., 30z (hereinafter referred to as a "data collection unit 30", unless otherwise specifically distinguished), and a plurality of estimation processing units 40a, 40b, ..., 40z (hereinafter referred to as an "estimation processing unit 40", unless otherwise specifically distinguished). The data collection unit 30 has a function of collecting the operation mode data of the windshield wiper within a predetermined period. The estimation processing unit 40 has a function of statistically processing the collected operation mode data of the windshield wiper, thereby estimating a precipitation index indicating an intensity of precipitation within the predetermined period.

The estimation processing unit 40 includes a statistical processing unit 42, a precipitation index estimation unit 48, and a storage unit 54. The statistical processing unit 42 has a function of statistically processing the operation mode data of the windshield wiper, and includes a proportion derivation unit 44 and an index derivation unit 46.

Each function of the processing apparatus 10 may be implemented by a large-scale integration (LSI) including a circuit block, a memory, and other elements in terms of hardware, and may be implemented by system software, an application program, or the like, loaded in the memory, in terms of software. Therefore, a person skilled in the art would understand that each function of the processing apparatus 10 may be implemented in various forms, by hardware only, by software only, or by a combination of hardware and software, and is not limited to any one thereof.

The vehicle state information acquisition unit 20 acquires all the vehicle state information received by the server apparatus 3. When the server apparatus 3 receives the vehicle state information from the vehicle 5 and stores it in a designated storage device, the vehicle state information acquisition unit 20 may immediately read and thereby acquire the vehicle state information from the storage device. When the processing apparatus 10 is provided as one function of the server apparatus 3, the vehicle state information acquisition unit 20 may receive the vehicle state information from a receiving unit of the server apparatus 3.

A combination of one data collection unit 30 and one estimation processing unit 40 is allocated to one unit area. For example, a combination of the data collection unit 30a and the estimation processing unit 40a is assigned to estimation of a precipitation index of a first area, and a combination of the data collection unit 30b and the estimation processing unit 40b is assigned to estimation of a precipitation index of a second area. Therefore, the number of combinations of the data collection unit 30 and the estimation processing unit 40 is equal to the number of areas that are defined by dividing the map.

The data collection unit 30 collects the operation mode data of the windshield wiper, acquired in one or more vehicles positioned in a predetermined area within a predetermined period. Specifically, the data collection unit 30 collects the operation mode data of the windshield wiper, acquired in an area to which it is allocated, from the CAN information 9 acquired by the vehicle state information acquisition unit 20. As illustrated in FIG. 2B, the operation mode data of the windshield wiper is associated with the date and time at which the operation mode data of the windshield wiper is acquired and the latitude and longitude at which the operation mode data of the windshield wiper is acquired. The data collection unit 30 collects the operation mode data of the windshield wiper associated with the latitude and longitude of the area to which it is allocated.

Based on a proportion of each of the plurality of kinds of operation modes, which is derived from the collected operation mode data, the precipitation index estimation unit 48 estimates a precipitation index indicating an intensity of precipitation in the predetermined area within the predetermined period. By using the proportion of each kind of operation mode, which is acquired by statistical processing, the precipitation index estimation unit 48 can estimate the precipitation index within the predetermined period with high accuracy.

Figure 5:
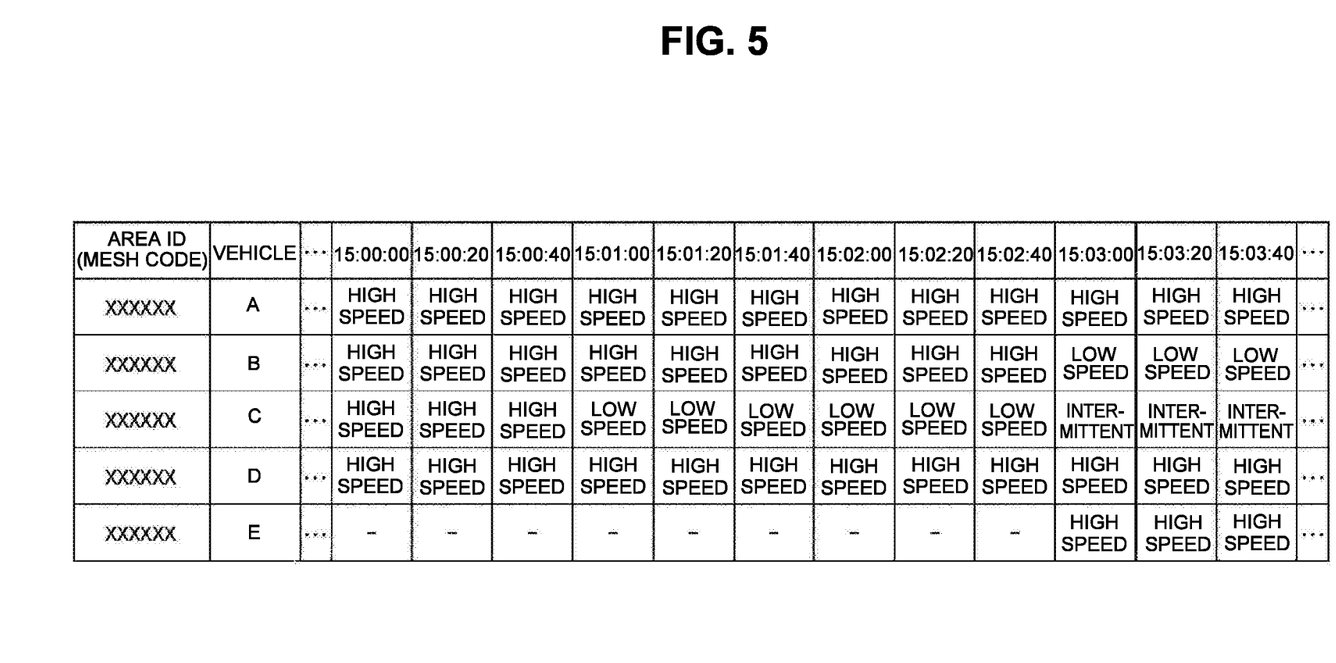
FIG. 5 is a table illustrating examples of operation mode data collected by a data collection unit.

FIG. 5 illustrates an example of the operation mode data collected by the data collection unit 30. The data collection unit 30 collects, from the vehicle state information acquired by the vehicle state information acquisition unit 20, the operation mode data acquired in one or more vehicles positioned in an area having an area ID, "XXXXXX", within a period from 15:00:00 to 15:03:59.

In the example illustrated in FIG. 5, there are five vehicles 5—vehicles A, B, C, D, and E—that travel in the area ID, "XXXXXX", within the period from 15:00:00 to 15:03:59. Among the five vehicles 5, vehicles A, B, C, and D travel in the area for four minutes from 15:00:00 to 15:03:59, and vehicle E travels in the area from 15:03:00.

Figure 6:
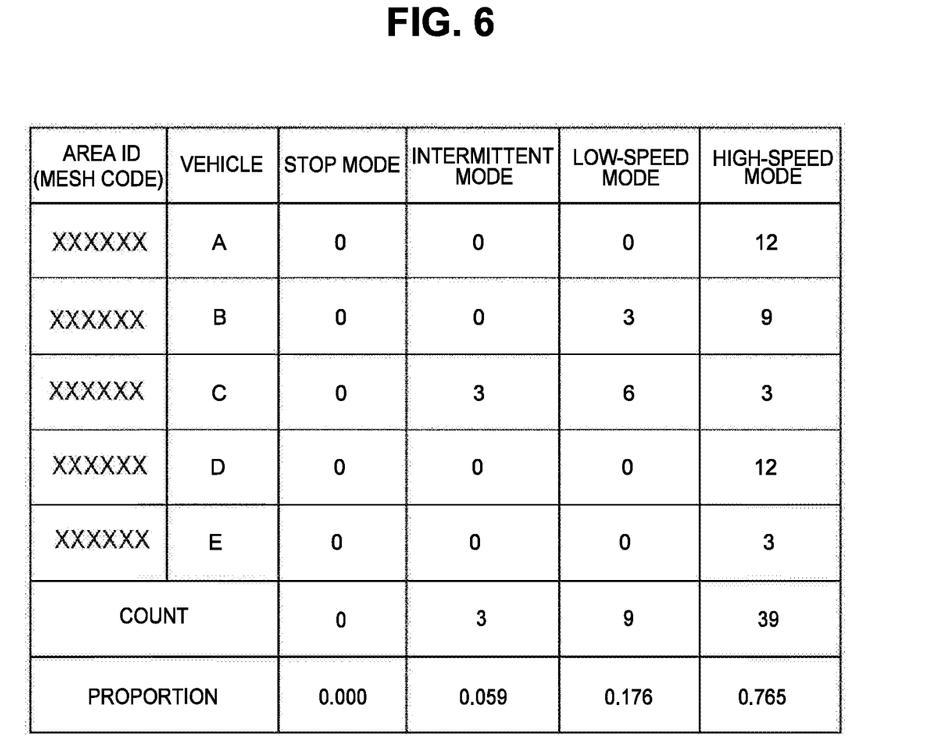
FIG. 6 is a table illustrating results of counting the number of pieces of the operation mode data acquired in each vehicle, for each of a plurality of kinds of operation modes.

The proportion derivation unit 44 counts the number of pieces of the operation mode data, for each of the plurality of kinds of operation modes indicated in the collected operation mode data, and derives a proportion of each of the plurality of kinds of operation modes. FIG. 6 illustrates the results of counting the number of pieces of the operation mode data acquired in the vehicles, for each of the plurality of kinds of operation modes. For example, in vehicle A, none of the operation mode data indicating the stop mode, the operation mode data indicating the intermittent mode, and the operation mode data indicating the low-speed mode are acquired, and 12 pieces of the operation mode data indicating the high-speed mode are acquired, that is, the operation mode data indicating the high-speed mode is acquired 12 times, during the period of four minutes.

The proportion derivation unit 44 counts, for each of the plurality of kinds of operation modes, the number of times that the operation mode data is acquired in all the vehicles, as follows:
Stop mode: 0 time
Intermittent mode: 3 times
Low-speed mode: 9 times
High-speed mode: 39 times Based on the above counting results, the proportion derivation unit 44 derives a proportion of each of the plurality of kinds of operation modes, as follows:
Stop mode: 0.000
Intermittent mode: 0.059
Low-speed mode: 0.176
High-speed mode: 0.765

Based on the proportion of each of the plurality of kinds of operation modes, the precipitation index estimation unit 48 estimates a precipitation index within the predetermined period in the area to which it is allocated.

Figure 7:
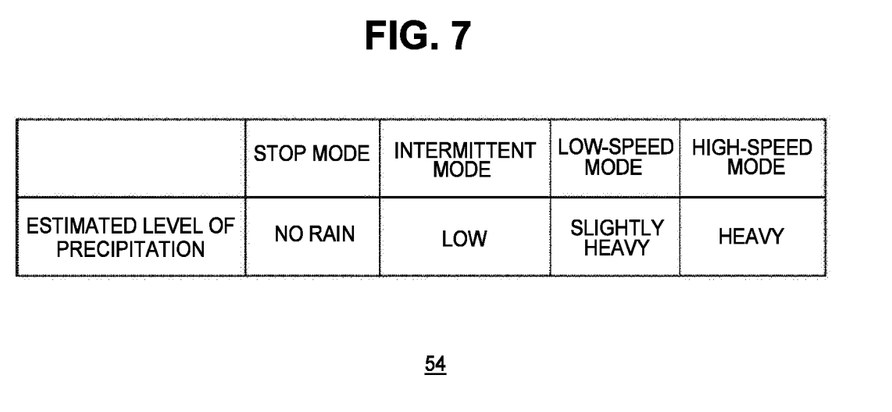
FIG. 7 illustrates a precipitation level correspondence table stored in a storage unit.

FIG. 7 illustrates a precipitation level correspondence table stored in the storage unit 54. In the precipitation level correspondence table, an estimated precipitation level is defined for each operation mode. The precipitation index estimation unit 48 may read an estimated precipitation level corresponding to an operation mode with the highest proportion from the storage unit 54, and derive the estimated precipitation level as a precipitation index. In this example, since the proportion of the high-speed mode is the highest, the precipitation index estimation unit 48 reads the estimated precipitation level "heavy" from the storage unit 54, and thus determines that the precipitation level in an allocated area is "heavy".

Each estimation processing unit 40 estimates a precipitation index (in this example, a precipitation level) in the allocated area, from the operation mode data during the four minutes from 15:00:00 to 15:03:59. The processing apparatus 10 supplies, to the server apparatus 3, the precipitation index data for all the areas within the predetermined period, and the server apparatus 3 transmits the precipitation index data for all the areas to the weather information presentation apparatus 7. In the present embodiment, the processing apparatus 10 provides the precipitation index data for all the areas to the weather information presentation apparatus 7 every four minutes, so that the weather information presentation apparatus 7 can update real time weather information with high accuracy every four minutes, and present it to the users.

The precipitation index estimation unit 48 may estimate a precipitation index based on a result of another statistical processing executed by the statistical processing unit 42. With this estimation method, the precipitation index estimation unit 48 uses a windshield wiper operation mode index derived by the statistical processing, thereby increasing the accuracy of estimating the precipitation index.

Specifically, the index derivation unit 46 of the statistical processing unit 42 derives an operation mode index indicating a stage of the operation mode of the windshield wiper, based on the proportion of each of the plurality of kinds of operation modes. A weight for calculating the index is defined for each operation mode. The index derivation unit 46 may calculate an operation mode index indicating a stage of the operation mode, by multiplying the proportion of each operation mode by the weight for the operation mode, and adding up the values acquired through multiplication performed for all the operation modes.

Figure 8:
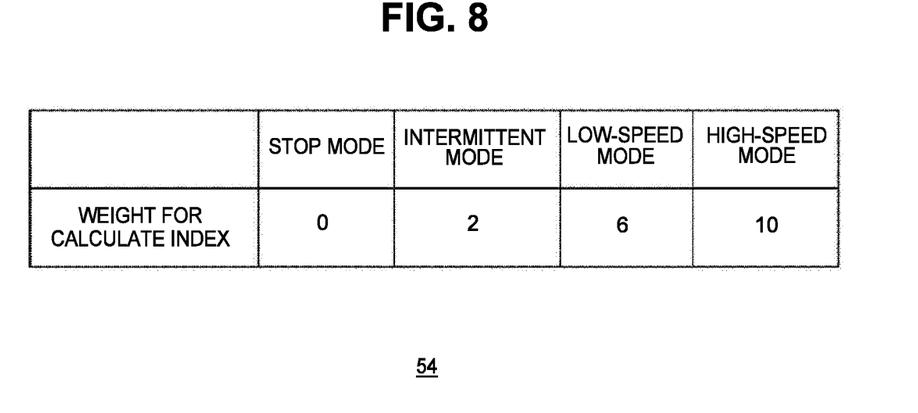
FIG. 8 illustrates a weight correspondence table stored in the storage unit.

FIG. 8 illustrates a weight correspondence table stored in the storage unit 54. In the weight correspondence table, a weight for calculating an index is defined for each operation mode. The index derivation unit 46 refers to the weight correspondence table and calculates, using the following calculation formula, an index (an operation mode index) indicating a stage of the operation mode. The minimum value of the operation mode index is 0, and the maximum value thereof is 10.

(Operation mode index)=Σ(proportion of each operation mode)×(weight of the operation mode)

An operation mode index is calculated using the proportion of each of the plurality of kinds of operation modes illustrated in FIG. 6, as follows:

(Operation mode index)=0.000×0+0.059×2+0.176× 6+0.765×10=8.824

The operation mode index is used to estimate a precipitation index. The calculated index may be changed to an integer value by rounding off the decimal places.

When all the windshield wipers are operated in the high-speed mode, the operation mode index is the maximum value of 10. The calculated operation mode index expresses a degree of the operation state of the windshield wiper with respect to the maximum value, and is highly correlated to the precipitation amount. The precipitation index estimation unit 48 estimates a precipitation index in the allocated area within the predetermined period from the operation mode index derived by the index derivation unit 46. For example, when the weather information presentation apparatus 7 expresses the precipitation amount on a scale of level 1 to level 10 and presents it to the users, the precipitation index estimation unit 48 may derive, as precipitation index data, a level of the precipitation amount that corresponds to the operation mode index. The storage unit 54 may store a correspondence table illustrating a correspondence between the operation mode index and the level of the precipitation amount, and the precipitation index estimation unit 48 may derive the level of the precipitation amount to be used as the precipitation index, by referring to the correspondence table. In addition, the precipitation index estimation unit 48 may acquire the level of the precipitation amount by correcting the operation mode index with a predetermined correction function.

According to the above method, the proportion derivation unit 44 derives the proportion of each of the plurality of kinds of operation modes from all the operation mode data for the windshield wiper acquired within the predetermined period. With this statistical processing method, a tendency for selecting a windshield wiper operation mode within the predetermined period is derived.

However, the operation mode of the windshield wiper tends to reflect a driver's preference, and, in some cases, is set to the high-speed mode or the low-speed mode depending on the driver's preference, regardless of the precipitation amount. The operation mode data of the windshield wiper of such a vehicle becomes noise in estimation of the precipitation index, and there is a possibility that the driver's preference may be reflected in the precipitation index.

Therefore, the correlation output unit 14 finds a reliable vehicle having a high degree of correlation between the operation mode data of the windshield wiper and the actual precipitation amount, and the precipitation estimation unit 12 estimates the precipitation index, based on the operation mode data of the windshield wiper of the vehicle having the high degree of correlation. As such, it is possible to estimate the precipitation index with good accuracy based on reliable operation mode data of the windshield wiper.

Figure 9:
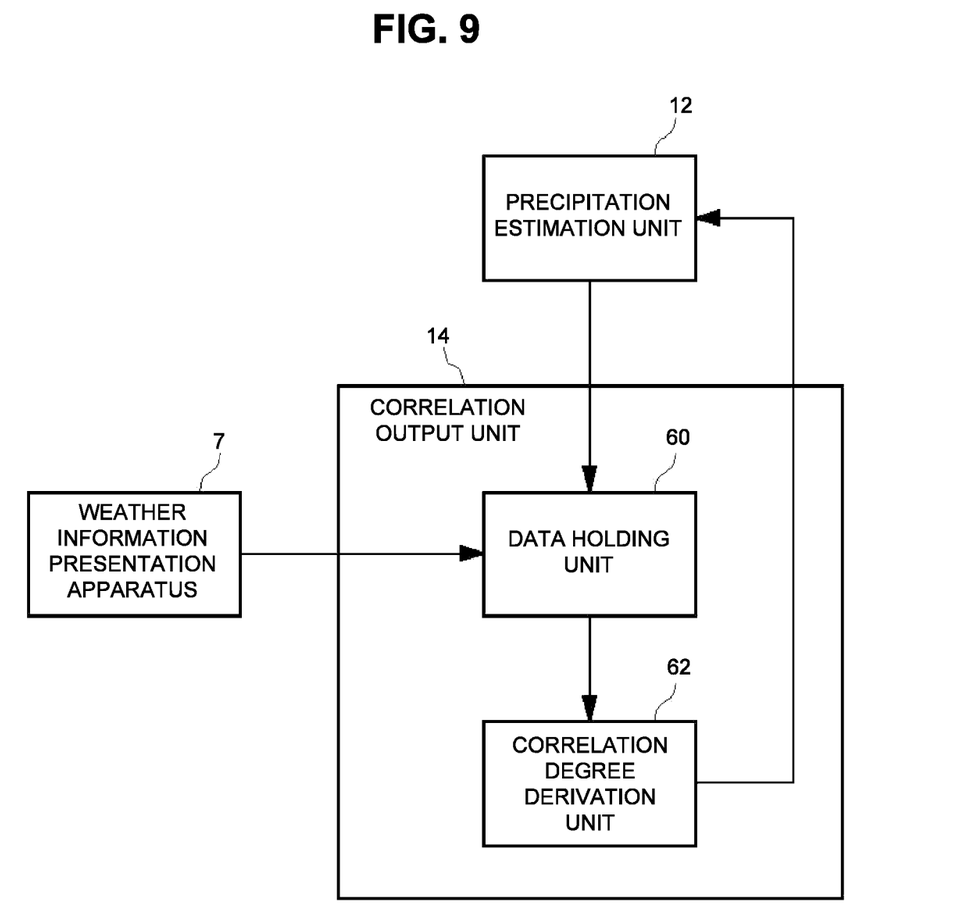
FIG. 9 is a diagram illustrating functional blocks of a correlation output unit of the processing apparatus.

FIG. 9 illustrates functional blocks of the correlation output unit 14 of the processing apparatus 10. The correlation output unit 14 includes a data holding unit 60 and a correlation degree derivation unit 62. The correlation output unit 14 derives a degree of correlation between the operation mode data of the windshield wiper and actual precipitation amount data for each vehicle, and outputs the degree of correlation for each vehicle to the precipitation estimation unit 12. Whereas the precipitation estimation unit 12 estimates the precipitation index in real time, the correlation output unit 14 may derive the degree of correlation at a cycle of, for example, one month ex post facto.

The data holding unit 60 holds the operation mode data of the windshield wiper in association with the precipitation amount data for each vehicle. The data holding unit 60 acquires the operation mode data of the windshield wiper from the data collection unit 30 of the precipitation estimation unit 12, and acquires the precipitation amount data from the weather information presentation apparatus 7. The operation mode data of the windshield wiper is associated with the vehicle's position information at which the operation mode data is acquired and the time at which the operation mode data is acquired. The precipitation amount data is also associated with the vehicle's position information at which the precipitation amount data is acquired and the time at which the precipitation amount data is acquired. Alternatively, the precipitation amount data may be a precipitation index estimated by the precipitation estimation unit 12. Meanwhile, the data holding unit 60 holds the operation mode data of the windshield wiper in association with other vehicle information, such as the vehicle speed.

The correlation degree derivation unit 62 derives the degree of correlation between the operation mode data of the windshield wiper and the precipitation amount data for each vehicle. The relationship between the operation mode of the windshield wiper and an ideal precipitation amount is, for example, predefined as described below. If the relationship deviates from the definition below, the degree of correlation is determined to be low, while if the relationship satisfies the definition below, the degree of correlation is determined to be high. In the stop mode, the hourly precipitation amount is 0 mm. In the intermittent mode, the hourly precipitation amount is more than 0 mm and less than 10 mm. In the low-speed mode, the hourly precipitation amount is 10 mm or more and less than 20 mm. In the high-speed mode, the hourly precipitation amount is 20 mm or more.

The correlation degree derivation unit 62 derives the degree of correlation between the operation mode data of the windshield wiper and the precipitation amount data for each vehicle depending on a degree to which the relationship between the operation mode data of the windshield wiper and the precipitation data satisfies the definition.

Figure 10A:
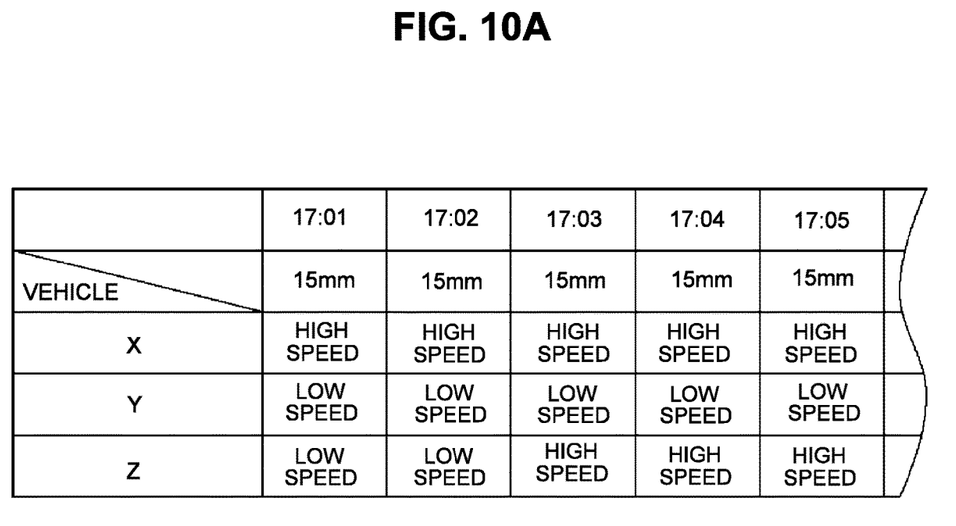
FIG. 10A is a table for describing a method of deriving a degree of correlation, executed by a correlation degree derivation unit, and for illustrating a relationship between a precipitation amount and the operation mode data of a windshield wiper.
Figure 10B:
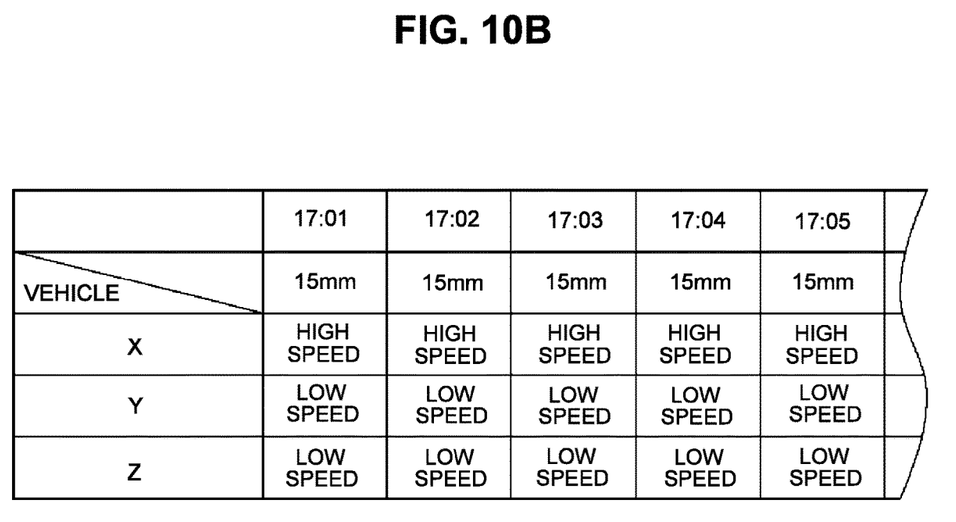
FIG. 10B is a table for describing the method of deriving the degree of correlation, executed by the correlation degree derivation unit, and for illustrating the relationship between the precipitation amount and the operation mode data of the windshield wiper.

FIGS. 10A and 10B are tables for describing a method of deriving a degree of correlation, executed by the correlation degree derivation unit 62. Specifically, FIGS. 10A and 10B illustrate the relationship between the hourly precipitation amount and the operation mode data of the windshield wiper for each vehicle.

In FIG. 10A, the hourly precipitation amount is 15 mm at all time shown on the table. Thus, when the operation mode data of the windshield wiper indicates the low-speed mode, a high degree of correlation is derived. In the case of vehicle Y, all the relationships between the operation mode data of the windshield wiper and the precipitation amount data satisfy the definition. Therefore, the correlation degree derivation unit 62 derives a relatively high degree of correlation of, for example, 10 on a 10-degree evaluation scale.

In the case of vehicle X, no relationship between the operation mode data of the windshield wiper and the precipitation amount data satisfies the definition. Therefore, the correlation degree derivation unit 62 derives a relatively low degree of correlation of, for example, 1 on the 10-degree evaluation scale. In the case of vehicle Z, some of the relationships between the operation mode data of the windshield wiper and the precipitation data satisfy the definition. Therefore, the correlation degree derivation unit 62 derives a medium degree of correlation of, for example, 5 on the 10-degree evaluation scale.

As described above, the degree of correlation for each vehicle, derived by the correlation degree derivation unit 62, is used when the estimation processing unit 40 estimates the precipitation index. For example, the estimation processing unit 40 may estimate the precipitation index based on the operation mode data of the windshield wiper of a vehicle having a degree of correlation of 5 or higher. As such, by using operation mode data of a vehicle having a high degree of correlation, the accuracy of the estimation can be improved.

However, even if the precipitation amount is the same, the operation mode of the windshield wiper may be set to a different mode depending on the vehicle speed. For example, when the vehicle speed increases, the operation mode is more likely to be set to the high-speed mode. In other words, even if the hourly precipitation amount is 15 mm when the vehicle speed is 60 km/h, there is a high possibility that the windshield wiper operates in the high-speed mode. Therefore, the correlation degree derivation unit 62 may change the operation mode data depending on the vehicle speed, and then derive the degree of correlation based on the changed operation mode data of the windshield wiper.

FIG. 10B illustrates the relationship between the precipitation amount data and the operation mode data of the windshield wiper to which the correlation degree derivation unit 62 changes from the operation mode data of the windshield wiper illustrated in FIG. 10A based on the vehicle speed. The correlation degree derivation unit 62 has a conversion table to change the operation mode data of the windshield wiper based on the vehicle speed. For example, when the vehicle speed is 50 km/h or higher, the correlation degree derivation unit 62 lowers the actual operation mode by one stage.

In FIG. 10B, vehicle Z is travelling at a vehicle speed of 50 km/h or higher at 17:03 or later, and the operation mode data of the windshield wiper, which indicates the high-speed mode in FIG. 10A, is lowered to indicate the low-speed mode. The correlation degree derivation unit 62 changes the operation mode data of the windshield wiper based on the vehicle speed, and then derives the degree of correlation between the changed operation mode data of the windshield wiper and the precipitation amount. After the change, the relationships between the operation mode data of the windshield wiper and the precipitation amount data in vehicle Z satisfy the definition. As a result, the correlation degree derivation unit 62 derives a high degree of correlation of, for example, 10 on the 10-degree evaluation scale. As such, the correlation degree derivation unit 62 derives the degree of correlation based on the vehicle speed, the operation mode data of the windshield wiper, and the precipitation amount data, thereby improving the accuracy of the estimation.

Alternatively, the correlation degree derivation unit 62 may derive the degree of correlation between the precipitation amount and the operation mode data of the windshield wiper based only on the operation mode data that is derived when the vehicle speed is less than a predetermined value, not based on the operation mode data that is derived when the vehicle speed is equal to or higher than the predetermined value. In this manner, it is possible to use the operation mode data of the windshield wiper that is little influenced by the vehicle speed.

The degree of correlation for each vehicle, which is derived by the correlation output unit 14, is transmitted to the precipitation estimation unit 12. The estimation processing unit 40 of the precipitation estimation unit 12 estimates the precipitation index based on the operation mode data from a vehicle having a relatively high degree of correlation. In this manner, the accuracy of estimation of the precipitation index can be improved. The estimation processing unit 40 may change the operation mode data of the windshield wiper based on the vehicle speed, and then estimate the precipitation index based on the changed operation mode data of the windshield wiper.

The estimation processing unit 40 preferentially collects, for example, the operation mode data of the windshield wiper of a vehicle having a relatively high degree of correlation in a unit area. When the number of pieces of the collected operation mode data of the windshield wiper is equal to or higher than a predetermined number of samples, the estimation processing unit 40 estimates the precipitation index based on the predetermined number of operation mode data samples. In this manner, when there is a large number of pieces of operation mode data of the windshield wiper in a unit area, the estimation processing unit 40 can extract the operation mode data of the windshield wiper from a vehicle having a high degree of correlation between the operation mode data of the windshield wiper and the precipitation amount data, and estimate the precipitation index. As such, it is possible to estimate the precipitation index with good accuracy, while reducing a processing load.

The estimation processing unit 40 may estimate the precipitation index based on the operation mode data of the windshield wiper collected from a vehicle having a degree of correlation which is equal to or higher than a predetermined threshold value. For example, the estimation processing unit 40 estimates the precipitation index based on the operation mode data of the windshield wiper collected from the vehicle having the degree of correlation of 5 or higher. As such, it is possible to estimate the precipitation index with good accuracy, while reducing the processing load. The predetermined threshold value may be set depending on the number of the samples of the operation mode data of the windshield wiper in the unit area.

If the number of pieces of the operation mode data of the windshield wiper in the unit area is equal to or less than the predetermined number of samples, the estimation processing unit 40 may estimate the precipitation index based on the operation mode data of the windshield wiper weighted depending on the degree of correlation. For example, the estimation processing unit 40 weights the operation mode data of the windshield wiper depending on the degree of correlation such that the higher the degree of correlation between the operation mode data of the windshield wiper of a vehicle and precipitation amount is, the larger the share of the operation mode data of the windshield wiper of the vehicle in the total number of the samples is. Then, based on the weighted operation mode data of the windshield wiper, the estimation processing unit 40 estimates the precipitation index. In this manner, even if the number of samples is small, it is possible to estimate the precipitation index with good accuracy by weighting, while using the operation mode data of the windshield wiper of a vehicle having a low degree of correlation without discarding the data.

The present disclosure has been described based on the embodiments and a plurality of examples. The present disclosure is not limited to the above-described embodiments and examples, and variations such as design modifications, and the like, can be made based on the knowledge of those skilled in the art.

What is claimed is:

1. A processing apparatus comprising:
   circuitry configured to:
   collect operation mode data comprising different stages respectively corresponding to different wiping frequencies, the operation mode data being acquired in a plurality of vehicles each equipped with a windshield wiper system configured to report the stages;
   derive a degree of correlation between the operation mode data and precipitation amount data, for each of the plurality of vehicles;
   estimate a precipitation index indicating an intensity of precipitation based on the operation mode data collected from a first vehicle having a relatively high degree of correlation between the operation mode data and precipitation amount data as opposed to a second vehicle having a relatively low degree of correlation between the operation mode data and precipitation amount data, the relatively low degree of correlation being lower than the relatively high degree of correlation, and the first vehicle and the second vehicle being included in the plurality of vehicles; and
   increase or decrease a corresponding stage of the operation mode data received from one of the plurality of vehicles based upon a vehicle speed of the one of the plurality of vehicles, the one of the plurality of vehicles being external to the processing apparatus.

2. The processing apparatus according to claim 1, wherein the first vehicle having the relatively high degree of correlation is a vehicle having a degree of correlation equal to or higher than a predetermined threshold value, and
   the second vehicle having the relatively low degree of correlation is a vehicle having a degree of correlation less than the predetermined threshold value.

3. The processing apparatus according to claim 1, wherein the circuitry is configured to derive the degree of correlation for one of the plurality of vehicles based only on operation mode data derived when a vehicle speed of the one of the plurality of vehicles is less than a predetermined value.

4. The processing apparatus according to claim 2, wherein the predetermined threshold value is set depending on a number of samples of the operation mode data.

5. The processing apparatus according to claim 1, wherein the circuitry is configured to derive the degree of correlation based on the increased or decreased stage of the operation mode data.

6. The processing apparatus according to claim 1, wherein the circuitry is configured to estimate the precipitation index within a predetermined period for each of a plurality of unit areas.

7. The processing apparatus according to claim 6, wherein a size of the unit areas varies depending on population density.

8. The processing apparatus according to claim 1, wherein the circuitry is configured to provide the precipitation index to a weather information presentation apparatus.

9. The processing apparatus according to claim 1, wherein deriving the degree of correlation between the operation mode data and the precipitation amount data includes:
  setting the degree of correlation for one of the plurality of vehicles to a higher value when the operation mode selected for a certain hourly precipitation amount in the one of the plurality of vehicles satisfies a predetermined relationship between operation modes and hourly precipitation amounts, and
  setting the degree of correlation for the one of the plurality of vehicles to a lower value that is lower than the higher value when the operation mode selected for the certain hourly precipitation amount in the one of the plurality of vehicles does not satisfy the predetermined relationship.

10. The processing apparatus according to claim 9, wherein the operation modes include a stop mode, an intermittent mode, a low-speed mode, and a high-speed mode.

11. The processing apparatus according to claim 10, wherein the predetermined relationship includes:
  the stop mode being selected for an hourly precipitation amount of 0 mm,
  the intermitted mode being selected for an hourly precipitation amount of more than 0 mm and less than a first value,
  the low-speed mode being selected for an hourly precipitation amount of the first value or more and less than a second value, and
  the high-speed mode being selected for an hourly precipitation amount of the second value or more.

12. The processing apparatus according to claim 11, wherein
  the first value is 10 mm, and
  the second value is 20 mm.

13. A processing method performed by an apparatus, the method comprising:
  collecting operation mode data comprising different stages respectively corresponding to different wiping frequencies, the operation mode data being acquired in a plurality of vehicles each equipped with a windshield wiper system configured to report the stages;
  deriving a degree of correlation between the operation mode data and precipitation amount data, for each of the plurality of vehicles;
  estimating a precipitation index indicating an intensity of precipitation based on the operation mode data collected from a first vehicle having a relatively high degree of correlation between the operation mode data and precipitation amount data as opposed to a second vehicle having a relatively low degree of correlation between the operation mode data and precipitation amount data, the relatively low degree of correlation being lower than the relatively high degree of correlation, and the first vehicle and the second vehicle being included in the plurality of vehicles; and
  increasing or decreasing a corresponding stage of the operation mode data received from one of the plurality of vehicles based upon a vehicle speed of the one of the plurality of vehicles, the one of the plurality of vehicles being external to the apparatus.

* * * * *